US012565145B2

(12) United States Patent
Otsu et al.

(10) Patent No.: US 12,565,145 B2
(45) Date of Patent: Mar. 3, 2026

(54) IN-VEHICLE APPARATUS, INFORMATION PROCESSING METHOD, AND PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Tomohiro Otsu, Yokkaichi (JP); Takeshi Hagihara, Yokkaichi (JP); Hirofumi Urayama, Yokkaichi (JP); Hideki Maeda, Yokkaichi (JP); Darmawan Go, Yokkaichi (JP); Yoshitaka Kikuchi, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 157 days.

(21) Appl. No.: 18/569,143

(22) PCT Filed: May 25, 2022

(86) PCT No.: PCT/JP2022/021321
§ 371 (c)(1),
(2) Date: Dec. 11, 2023

(87) PCT Pub. No.: WO2022/264762
PCT Pub. Date: Dec. 22, 2022

(65) Prior Publication Data
US 2024/0351520 A1     Oct. 24, 2024

(30) Foreign Application Priority Data

Jun. 15, 2021 (JP) ................................. 2021-099681

(51) Int. Cl.
*B60Q 9/00* (2006.01)
*B60R 16/023* (2006.01)

(52) U.S. Cl.
CPC ............ *B60Q 9/00* (2013.01); *B60R 16/0231* (2013.01)

(58) Field of Classification Search
CPC .............................. B60Q 9/00; B60R 16/0231
See application file for complete search history.

(56) References Cited

U.S. PATENT DOCUMENTS

| | | | |
|---|---|---|---|
| 6,577,326 B1 * | 6/2003 | Heuvelman ............ | H04N 5/765 |
| | | | 715/717 |
| 2014/0047255 A1 * | 2/2014 | Sasaki ..................... | H04L 12/40 |
| | | | 713/323 |

(Continued)

FOREIGN PATENT DOCUMENTS

| | | |
|---|---|---|
| CN | 112511615 A | 3/2021 |
| JP | 2012-049884 A | 3/2012 |

(Continued)

OTHER PUBLICATIONS

International Search Report, Application No. PCT/JP2022/021321, mailed Aug. 2, 2022. ISA/Japan Patent Office.

*Primary Examiner* — Nimesh G Patel
(74) *Attorney, Agent, or Firm* — Honigman LLP

(57) ABSTRACT

An in-vehicle apparatus according to the present disclosure is an in-vehicle apparatus that is mounted in a vehicle and connected to another in-vehicle apparatus to be capable of communicating with the other in-vehicle apparatus via an in-vehicle network, the in-vehicle apparatus including: a control unit that controls communication with the other in-vehicle apparatus. When the control unit causes the in-vehicle apparatus to transition from a normal state to a sleep state, the control unit generates a notification message that is defined by AUTOSAR by including, in the notifica- (Continued)

tion message, a deactivation flag for causing the other in-vehicle apparatus to deactivate disconnection detection, and outputs the generated notification message.

7 Claims, 7 Drawing Sheets

(56)                References Cited

U.S. PATENT DOCUMENTS

| | | | |
|---|---|---|---|
| 2017/0139778 A1 | 5/2017 | Kito et al. | |
| 2018/0279098 A1* | 9/2018 | Kim | H04L 41/0246 |
| 2018/0352512 A1* | 12/2018 | Kim | H04L 67/12 |
| 2019/0263444 A1 | 8/2019 | Yoshikawa | |
| 2019/0319467 A1* | 10/2019 | Kim | H02J 7/0031 |
| 2020/0151132 A1* | 5/2020 | Kawashima | G06F 13/4027 |
| 2020/0389338 A1* | 12/2020 | Park | H04L 12/40039 |

FOREIGN PATENT DOCUMENTS

| | | | |
|---|---|---|---|
| JP | 2014-230022 A | 12/2014 | |
| JP | 2019-071572 A | 5/2019 | |
| WO | 2020-105657 A1 | 5/2020 | |

* cited by examiner

FIG. 6

Deactivation flags according to sleep classifications and sleep conditions

| | | Sleep classification | | | | |
|---|---|---|---|---|---|---|
| | | A | B | C | D | |
| Sleep condition | 01 | A01 | B01 | C01 | D01 | •01 |
| | 02 | A02 | B02 | C02 | D02 | •02 |
| | 03 | A03 | B03 | C03 | D03 | •03 |
| | 04 | A04 | B04 | C04 | D04 | •04 |
| | • | A• | B• | C• | D• | • • |

IN-VEHICLE APPARATUS, INFORMATION PROCESSING METHOD, AND PROGRAM

CROSS-REFERENCE TO RELATED APPLICATIONS

This application is the U.S. national stage of PCT/JP2022/021321 filed on May 25, 2022, which claims priority of Japanese Patent Application No. JP 2021-099681 filed on Jun. 15, 2021, the contents of which are incorporated herein.

TECHNICAL FIELD

The present disclosure relates to an in-vehicle apparatus, an information processing method, and a program.

BACKGROUND

A vehicle is equipped with a plurality of in-vehicle apparatuses including in-vehicle devices for a power train system for engine control and the like and a body system for air-conditioning control and the like, in-vehicle ECUs (Electronic Control Units) for controlling the in-vehicle devices, and relay apparatuses that relay communication between the in-vehicle devices and the in-vehicle ECUs. As a result of the plurality of in-vehicle apparatuses being connected, an in-vehicle network, in which the in-vehicle apparatuses (the in-vehicle devices, the in-vehicle ECUs, and the relay apparatuses) function as nodes, is constructed in the vehicle (for example, JP 2017-97851A, JP 2019-147427A, JP 2019-71572A and JP 2014-230022A). The plurality of in-vehicle apparatuses communicate via an in-vehicle network.

JP 2017-97851A and the like are problematic in that no consideration is given to processing for other in-vehicle ECUs when an in-vehicle ECU does not transmit a notification message such as an NM message when transitioning to a sleep state.

It is an object of the present disclosure to provide an in-vehicle apparatus and the like that can efficiently perform processing for other in-vehicle apparatuses and the like when transitioning to a sleep state.

SUMMARY

An in-vehicle apparatus according to an aspect of the present disclosure is an in-vehicle apparatus that is mounted in a vehicle and connected to another in-vehicle apparatus to be capable of communicating with the other in-vehicle apparatus via an in-vehicle network, the in-vehicle apparatus including: a control unit that controls communication with the other in-vehicle apparatus, wherein, when the control unit causes the in-vehicle apparatus to transition from a normal state to a sleep state, the control unit generates a notification message that is defined by AUTOSAR by including, in the notification message, a deactivation flag for causing the other in-vehicle apparatus to deactivate disconnection detection, and outputs the generated notification message.

Advantageous Effects

According to an aspect of the present disclosure, it is possible to provide an in-vehicle apparatus and the like that can efficiently perform processing for other in-vehicle apparatuses and the like while transitioning to a sleep state.

BRIEF DESCRIPTION OF DRAWINGS

FIG. 3 is an illustrative diagram (sequence diagram) showing an example of an aspect of processing performed by the in-vehicle apparatuses and the like.

FIG. 6 is an illustrative diagram showing an example of activation flags corresponding to sleep classifications and the like.

DETAILED DESCRIPTION OF PREFERRED EMBODIMENTS

Figure 1:
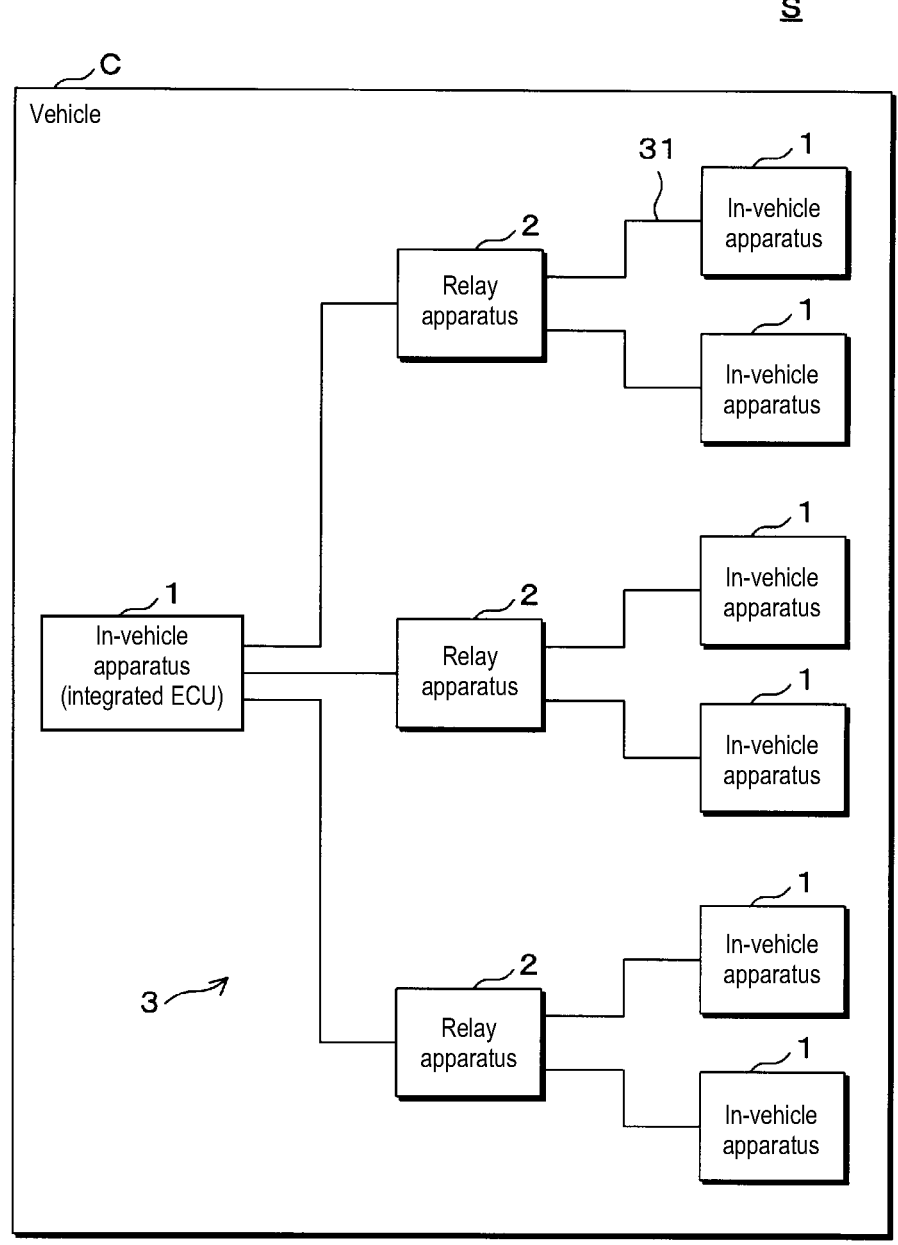
FIG. 1 is a schematic diagram showing an example of a configuration of an in-vehicle system that includes in-vehicle apparatuses according to Embodiment 1.

First, embodiments according to the present disclosure will be listed and described. At least some of the embodiments described below may be combined in any way.

An in-vehicle apparatus according to an aspect of the present disclosure is an in-vehicle apparatus that is mounted in a vehicle and connected to another in-vehicle apparatus to be capable of communicating with the other in-vehicle apparatus via an in-vehicle network, the in-vehicle apparatus including: a control unit that controls communication with the other in-vehicle apparatus, wherein, when the control unit causes the in-vehicle apparatus to transition from a normal state to a sleep state, the control unit generates a notification message that is defined by AUTOSAR (AUTomotive Open System ARchitecture) by including, in the notification message, a deactivation flag for causing the other in-vehicle apparatus to deactivate disconnection detection, and outputs the generated notification message.

According to this aspect of the present disclosure, the plurality of in-vehicle apparatuses that are connected so as to be capable of communicating with each other via the in-vehicle network continuously perform disconnection detection processing for detecting whether or not communication with the other in-vehicle apparatus can be properly performed by transmitting and receiving the notification message. The plurality of in-vehicle apparatuses include not only in-vehicle apparatuses that are each directly connected to an actuator, a sensor, and the like, but also relay apparatuses that relay communication between the in-vehicle apparatuses, and correspond to nodes in the in-vehicle network. When one of the plurality of in-vehicle apparatuses is caused to transition from a normal state to a sleep state, the control unit of the in-vehicle apparatus outputs (transmits) a notification message that includes a deactivation flag for deactivating disconnection detection to the other one of the plurality of in-vehicle apparatuses. The notification message is, for example, a message that conforms to the specifications of AUTOSAR. The other in-vehicle apparatus that has acquired (received) the notification message that includes the deactivation flag deactivates disconnection detection for the in-vehicle apparatus that is the transmission source of the notification message. As used herein, the expression "to deactivate disconnection detection" encompasses disabling a disconnection detection function, stopping processing, properly fixing a flag that indicates whether or not communication with the target in-vehicle apparatus can be properly performed, and the like. It is possible to efficiently prevent a situation in which, even when the control unit of the in-vehicle apparatus does not output a notification message for a predetermined period of time set by the sleep timer or the like after the control unit of the in-vehicle apparatus has output a notification message that includes a deactivation flag when transitioning to a sleep state, the other in-vehicle apparatus erroneously detects that the communication with the in-vehicle apparatus is disconnected.

In the in-vehicle apparatus according to the aspect of the present disclosure, the notification message is regularly transmitted and received between the in-vehicle apparatus and the other in-vehicle apparatus, and when the in-vehicle apparatus stays in the normal state, the control unit generates the notification message without including the deactivation flag in the notification message, and outputs the generated notification message.

According to this aspect of the present disclosure, when the in-vehicle apparatus stays in the normal state, the control unit of the in-vehicle apparatus generates and outputs the notification message without including the deactivation flag in the notification message, and thus the other in-vehicle apparatus keeps activating disconnection detection.

In the in-vehicle apparatus according to the aspect of the present disclosure, when the control unit causes the in-vehicle apparatus to transition from the normal state to the sleep state, the control unit generates the notification message by including, in the notification message, an activation flag for causing the other in-vehicle apparatus to activate disconnection detection, and outputs the generated notification message.

According to this aspect of the present disclosure, when the control unit causes the in-vehicle apparatus to transition from the sleep state to the normal state, the control unit of the in-vehicle apparatus generates a notification message that includes an activation flag for causing the other in-vehicle apparatus to activate disconnection detection, and outputs the generated notification message to the other in-vehicle apparatus. With this configuration, even if the disconnection detection of the other in-vehicle apparatus is deactivated, the disconnection detection of the other in-vehicle apparatus can be activated when the in-vehicle apparatus that is the target of the disconnection detection is caused to transition from the sleep state to the normal state.

In the in-vehicle apparatus according to the aspect of the present disclosure, the in-vehicle network uses CAN (Controller Area Network), LIN (Local Interconnect Network), FlexRay (registered trademark), or TCP/IP as a communication protocol, and the control unit outputs the notification message through broadcasting. As used herein, TCP is an abbreviation for Transmission Control Protocol, and IP is an abbreviation for Internet Protocol.

According to this aspect of the present disclosure, the communication protocol used in the in-vehicle network is CAN, LIN, FlexRay, or TCP/IP, and the notification message is, for example, an NM (Network Management) message that is defined by AUTOSAR. In the case where the communication protocol is TCP/IP, the notification message is output through broadcasting using UDP (User Datagram Protocol) defined by TCP/IP. As described above, in the in-vehicle network that uses the protocol that conforms to AUTOSAR, the in-vehicle apparatus that can efficiently perform processing for the other in-vehicle ECU and the like when transitioning to the sleep state can be used.

In the in-vehicle apparatus according to the aspect of the present disclosure, when the control unit causes the in-vehicle apparatus to transition from the normal state to the sleep state, the control unit determines a sleep classification that indicates a classification of the sleep state, generates the notification message that includes the deactivation flag corresponding to the determined sleep classification, and outputs the notification message to cause the other in-vehicle apparatus to deactivate disconnection detection.

According to this aspect of the present disclosure, the control unit of the in-vehicle apparatus generates and outputs (transmits) the notification message that includes the deactivation flag that corresponds to the sleep classification, and thus the in-vehicle apparatus can inform the other in-vehicle apparatus, which is the output destination, of the sleep classification of the in-vehicle apparatus. With this configuration, the other in-vehicle apparatus that has acquired (received) the notification message can perform processing that corresponds to the sleep classification of the in-vehicle apparatus that is the target of the deactivated disconnection detection.

In the in-vehicle apparatus according to the aspect of the present disclosure, when the control unit causes the in-vehicle apparatus to transition from the normal state to the sleep state, the control unit determines a sleep condition for causing the in-vehicle apparatus to transition to the sleep state, generates the notification message that includes the deactivation flag corresponding to the determined sleep condition, and outputs the notification message to cause the other in-vehicle apparatus to deactivate disconnection detection.

According to this aspect of the present disclosure, the control unit of the in-vehicle apparatus generates and outputs (transmits) the notification message that includes the deactivation flag that corresponds to the sleep condition, and thus the in-vehicle apparatus can inform the other in-vehicle apparatus, which is the output destination, of the sleep condition of the in-vehicle apparatus. With this configuration, the other in-vehicle apparatus that has acquired (received) the notification message can perform processing that corresponds to the sleep condition of the in-vehicle apparatus that is the target of the deactivated disconnection detection.

An information processing method according to an aspect of the present disclosure causes a computer that is mounted in a vehicle and connected to another computer to be capable of communicating with the other computer via an in-vehicle network to execute processing operations of: when the computer is caused to transition from a normal state to a sleep state, generating a notification message by including, in the notification message, a deactivation flag for causing the other computer to deactivate disconnection detection; and outputting the generated notification message.

According to this aspect of the present disclosure, it is possible to provide the information processing method that can cause the computer that is connected to the in-vehicle network to operate as an in-vehicle apparatus that can efficiently perform processing for the other computer and the like when the computer is caused to transition to the sleep state.

A program according to an aspect of the present disclosure causes a computer that is mounted in a vehicle and connected to another computer to be capable of communicating with the other computer via an in-vehicle network to execute processing operations of: when the computer is caused to transition from a normal state to a sleep state, generating a notification message by including, in the notification message, a deactivation flag for causing the other computer to deactivate disconnection detection; and outputting the generated notification message.

According to this aspect of the present disclosure, it is possible to cause the computer that is connected to the in-vehicle network to operate as an in-vehicle apparatus that can efficiently perform processing for the other computer and the like when the computer is caused to transition to the sleep state.

Specific examples of in-vehicle apparatuses 1 and the like according to embodiments of the present disclosure will be described below with reference to the drawings. It is to be noted that the present disclosure is not limited to the examples given below, and the scope of the present disclosure is indicated by the appended claims, and all changes that come within the scope of the claims and the meaning of equivalency of the claims are intended to be embraced within the scope of the present disclosure.

Embodiment 1

Figure 2:
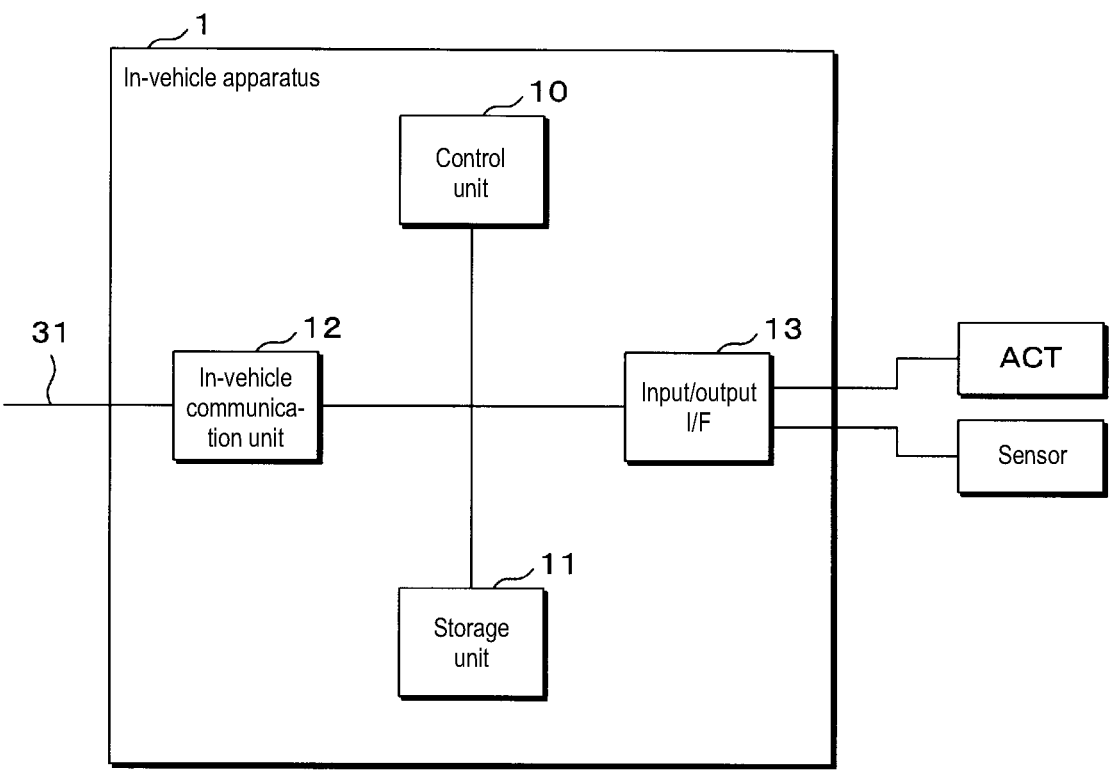
FIG. 2 is a block diagram showing an example of a configuration of an in-vehicle apparatus.

Hereinafter, an embodiment will be described with reference to the drawings. FIG. 1 is a schematic diagram showing an example of a configuration of an in-vehicle system S that includes in-vehicle apparatuses 1 according to Embodiment 1. FIG. 2 is a block diagram showing an example of a configuration of an in-vehicle apparatus 1. The in-vehicle system S includes a plurality of in-vehicle apparatuses 1 and a plurality of relay apparatuses 2 that are mounted in a vehicle C, and an in-vehicle network 3 to which the in-vehicle apparatuses 1 and the relay apparatus 2 are connected as nodes.

The communication protocol used in the in-vehicle network 3 is, for example, TCP/IP. The in-vehicle apparatuses 1 and the relay apparatus 2 are connected so as to be capable of communicating with each other via communication lines 31 such as Ethernet cables. The communication protocol is not limited to TCP/IP, and it is also possible to use CAN, LIN, or FlexRay. The plurality of in-vehicle apparatuses 1 and the plurality of relay apparatuses 2 that are connected to the in-vehicle network 3 belong to domains defined by logical or physical grouping. An in-vehicle apparatus 1 and a relay apparatus 2 that belong to the same domain transmit and receive a notification message periodically, regularly, or constantly so as to perform disconnection detection for determining a communication state with another in-vehicle apparatus 1.

The in-vehicle network 3 constitutes a cascaded topology in which an in-vehicle apparatus 1 that is connected to all of the plurality of relay apparatuses 2 is ranked the highest. The highest ranked in-vehicle apparatus 1 may be, for example, an integrated ECU that is configured using a vehicle computer or the like, and performs overall control of the vehicle C. In the in-vehicle network 3 that has a cascaded topology, in-vehicle apparatuses 1 that are connected under control of a relay apparatus 2 may be, for example, individual in-vehicle ECUs each connected to a sensor such as a LiDAR and an actuator (ACT) such as a lighting apparatus. The in-vehicle apparatuses 1 are not limited to in-vehicle ECUs or the like that are mounted in advance in the vehicle C, and may be, for example, external devices, such as electronic devices, that support a plug-and-play function of the vehicle C. That is, the in-vehicle apparatuses 1 may include external devices, such as electronic devices, that are connected to the vehicle C using the plug-and-play function.

The integrated ECU is connected directly or indirectly to an IG switch for starting up and shutting down the vehicle C. The integrated ECU may be configured to receive an on/off signal (an IG on signal or an IG off signal) transmitted from the IG switch. The integrated ECU may be configured to transmit a sleep signal or a wakeup signal based on the received IG on signal or IG off signal.

Each relay apparatus 2 may be, for example, a layer 2 switch or a layer 3 switch, and relays communication between a plurality of in-vehicle apparatuses 1 such as, for example, communication between the integrated ECU and an individual in-vehicle ECU, or communication between in-vehicle ECUs that are connected directly to the relay apparatus 2. The relay apparatus 2 may be a PLB (Power Lan Box) that is connected to a power supply apparatus, such as a battery, an alternator, or the like, mounted in the vehicle C with a power cable, and distributes and supplies power output from the power supply apparatus to the in-vehicle apparatuses 1 that are connected directly to the relay apparatus 2.

Each in-vehicle apparatus 1 includes a control unit 10, a storage unit 11, an in-vehicle communication unit 12, and an input/output I/F13. The control unit 10 includes a CPU (Central Processing Unit), an MPU (Micro Processing Unit), or the like. The control unit 10 performs various types of control processing and computation processing by reading a program (program product) and data stored in advance in the storage unit 11 and executing the program. The program and the like stored in the storage unit 11 may be a control program read from a recording medium 111 that can be read by the in-vehicle apparatus 1 and stored in the storage unit 11. Alternatively, the program (program product) and the like stored in the storage unit 11 may be a program (program product) downloaded from an external computer (not shown) that is connected to a communication network (not shown) and stored in the storage unit 11. The storage unit 11 may be a volatile memory element such as a RAM (Random Access Memory), or a non-volatile memory element such as a ROM (Read Only Memory), an EEPROM (Electrically Erasable Programmable ROM), or a flash memory.

The in-vehicle communication unit 12 may be, for example, an input/output interface (Ethernet PHY unit) that uses a communication protocol such as Ethernet, and the control unit 10 performs communication with another in-vehicle apparatus 1 and the relay apparatus 2 connected to the in-vehicle network 3 via the in-vehicle communication unit 12. In the case where the in-vehicle apparatus 1 is an integrated ECU, a plurality of in-vehicle communication units 12 are provided, and each of the in-vehicle communication units 12 is connected to a communication line 31 that constitutes the in-vehicle network 3.

The input/output I/F13 may be, for example, a communication interface for performing serial communication. The in-vehicle apparatus 1 performs communication with in-vehicle devices such as an actuator or a sensor via the input/output I/F13.

As with each in-vehicle apparatus 1, each relay apparatus 2 includes a control unit, a storage unit, and a plurality of in-vehicle communication units. The individual functional units have the same configuration as the functional units of the in-vehicle apparatus 1. The relay apparatus 2 may be, for example, an Ethernet switch (Ethernet SW) that functions as a layer 2 switch or a layer 3 switch. Network setting information for performing relay control (switching control) is stored in the storage unit of the relay apparatus 2.

Each of the in-vehicle apparatuses 1 and the relay apparatuses 2 that are connected to the in-vehicle network 3 can enter the following states: a sleep state in which power consumption is reduced (limited); and a normal state that is a state other than the sleep state. When the in-vehicle apparatuses 1 and the relay apparatuses 2 in the normal state receive, for example, a sleep signal, an IG off signal, or the like, it is determined that a sleep condition has been satisfied, and the in-vehicle apparatuses 1 and the relay apparatuses 2 transition from the normal state to the sleep state. When the in-vehicle apparatuses 1 and the relay apparatuses 2 in the sleep state receive, for example, a wakeup signal, an IG on signal, or the like, it is determined that a wakeup condition has been satisfied, and the in-vehicle apparatuses 1 and the relay apparatuses 2 transition from the sleep state to the normal state.

Figure 3:
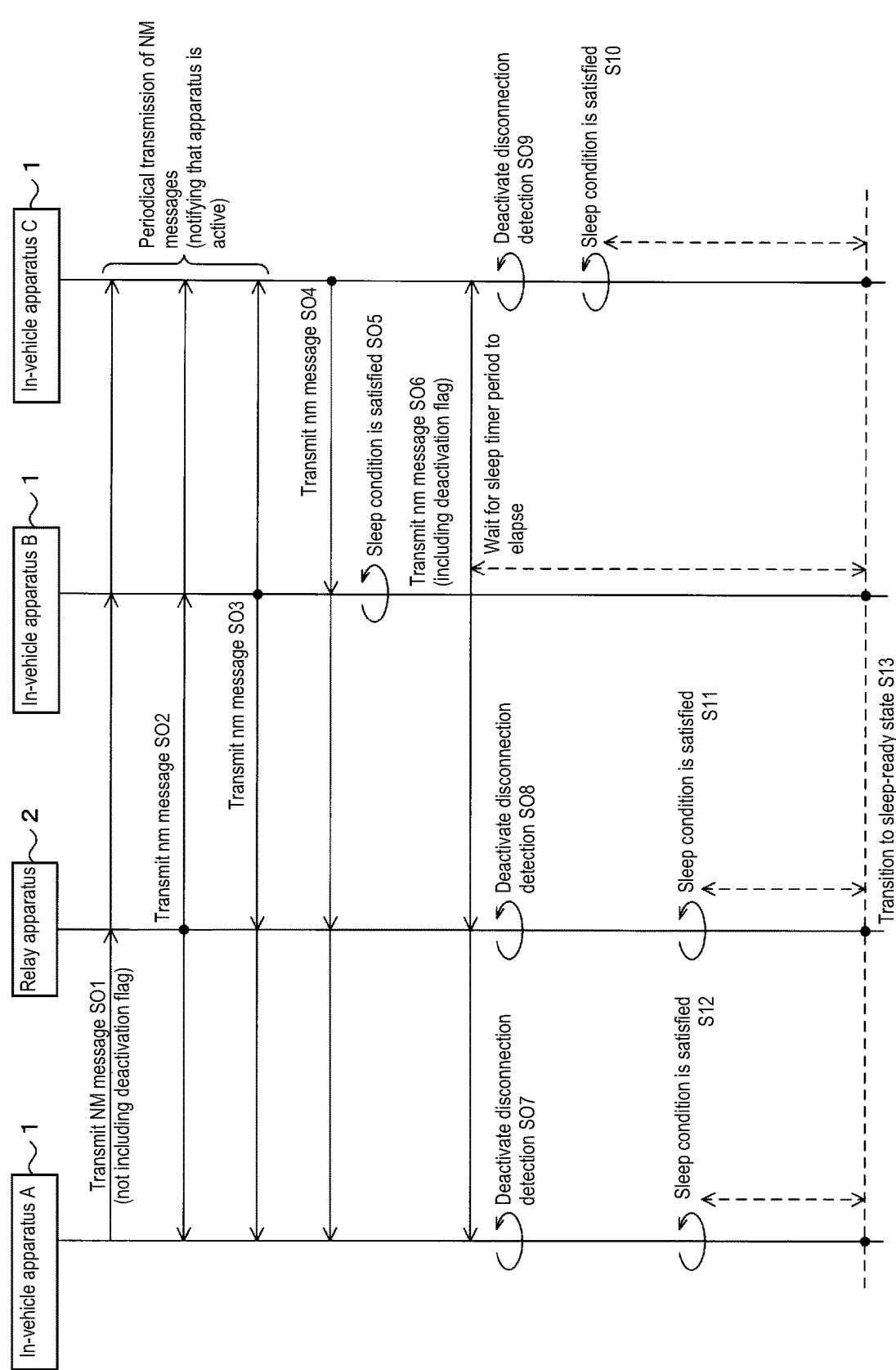

FIG. 3 is an illustrative diagram (sequence diagram) showing an example of an aspect of processing performed by the in-vehicle apparatuses 1 and the like. Based on a configuration shown in the diagram of the present embodiment that includes three in-vehicle apparatuses 1 that are connected to a relay apparatus 2 and belong to the same domain (are connected to a segment), processing operations of: transmitting and receiving notification messages; and transitioning to the sleep state performed by the in-vehicle apparatuses 1 and the relay apparatus 2 will be described.

As shown in the diagram of the present embodiment, the in-vehicle apparatuses 1 that is ranked the highest in a cascaded in-vehicle network 3 is an integrated ECU that includes a vehicle computer and the like. The remaining in-vehicle apparatuses 1 that are connected under control of the relay apparatus 2 are, for example, individual in-vehicle ECUs that are each connected to a sensor such as an LiDAR, and an actuator (ACT) such as a lighting apparatus. In the present embodiment, the in-vehicle apparatuses 1 that belong to the same domain include an integrated ECU (in-vehicle apparatus 1A) and two in-vehicle ECUs (in-vehicle apparatuses 1B and 1C). Furthermore, the relay apparatus 2 is deemed to correspond to an in-vehicle apparatus 1 that belongs to the same domain, and is therefore also treated in the same manner as the in-vehicle apparatuses 1 that belong to the same domain.

Each of the in-vehicle apparatuses 1 (including the relay apparatus 2) that belong to the same domain transmits, for example, a notification message, such as an NM message, that is defined by AUTOSAR (a notification indicating that the in-vehicle apparatus 1 is active) regularly or constantly to the other in-vehicle apparatuses 1. Then, upon receiving a notification message from each of the other in-vehicle apparatuses 1, the in-vehicle apparatus 1 determines whether or not communication is successfully established with the in-vehicle apparatuses 1 (disconnection detection). That is, if each of the in-vehicle apparatuses 1 including the relay apparatus 2 does not acquire a notification message (NM message) from the other in-vehicle apparatuses 1 for a period exceeding a transmission period of the notification message (NM message), the in-vehicle apparatus 1 performs disconnection detection to detect whether communication with another in-vehicle apparatus 1 is disconnected. As described above, each of the in-vehicle apparatuses 1 and the relay apparatus 2 has a disconnection detection function for detecting disconnection when communication with any one of the other in-vehicle apparatuses 1 and the like is disconnected.

The in-vehicle apparatus 1A transmits (outputs) a notification message (NM message) (S01). The relay apparatus 2 transmits (outputs) a notification message (NM message) (S02). The in-vehicle apparatus 1B transmits (outputs) a notification message (NM message) (S03). The in-vehicle apparatus 1C transmits (outputs) a notification message (NM message) (S04). These notification messages (NM messages) are transmitted (output) to all of the in-vehicle apparatuses 1 and the relay apparatus 2 that are connected to the same domain through, for example, broadcasting using UDP defined by TCP/IP serving as a communication protocol. Alternatively, the communication protocol may be CAN, LIN, or FlexRay. When the in vehicle apparatuses 1 are in the normal state, the notification messages (NM messages) are periodically transmitted and received. The communication between the in-vehicle apparatus 1A, the in-vehicle apparatus 1B, the in-vehicle apparatus 1C, and the like is performed via the relay apparatus 2, or in other words, relayed by the relay apparatus 2.

If any one of the in-vehicle apparatuses 1 that belong to the same domain (for example, the in-vehicle apparatus 1B) receives a signal that triggers a transition to the sleep state, such as, for example, a sleep signal, a mode change signal for changing the mode of the vehicle C, or an IG switch off signal, the in-vehicle apparatus 1B determines that a sleep condition has been satisfied (S05).

The in-vehicle apparatus 1B whose sleep condition has been satisfied generates a notification message that includes a deactivation flag for causing the other in-vehicle apparatuses 1 and the relay apparatus 2 to deactivate disconnection detection for the in-vehicle apparatus 1B, and transmits the generated notification message (including the deactivation flag) to the other in-vehicle apparatuses 1 and the relay apparatus 2 through, for example, broadcasting (S06). In the case where the notification message is, for example, an NM message that conforms to AUTOSAR, the in-vehicle apparatus 1B may generate a notification message that includes a deactivation flag by storing the deactivation flag in an area (user data area) of the payload of the NM message. The deactivation flag may be defined by, for example, a predetermined bit value or the like. After transmitting the notification message (including the deactivation flag), the in-vehicle apparatus 1B stops the periodical transmission of notification messages, without transmitting more notification messages.

The in-vehicle apparatus 1A that has received (acquired) the notification (including the deactivation flag) transmitted from the in-vehicle message apparatus 1B deactivates disconnection detection for the in-vehicle apparatus 1B that is the transmission source of the notification message (disables the disconnection detection function) (S07). Likewise, the relay apparatus 2 that has received (acquired) the notification message (including the deactivation flag) deactivates disconnection detection for the in-vehicle apparatus 1B (disables the disconnection detection function) (S08). Likewise, the in-vehicle apparatus 1C that has received (acquired) the notification message (including the deactivation flag) deactivates disconnection detection for the in-vehicle apparatus 1B (disables the disconnection detection function) (S09).

Upon receiving the notification message (including the deactivation flag) transmitted from the in-vehicle apparatus 1B, the in-vehicle apparatus 1A, the relay apparatus 2, and the in-vehicle apparatus 1C deactivate disconnection detection for the in-vehicle apparatus 1B. Accordingly, even if the in-vehicle apparatus 1A, the relay apparatus 2, and the in-vehicle apparatus 1C do not receive a notification message from the in-vehicle apparatus 1B thereafter, they do not make a determination that communication with the in-vehicle apparatus 1B is disconnected. With this configuration, it is possible to prevent each of the in-vehicle apparatus 1A, the relay apparatus 2, and the in-vehicle apparatus 1C from erroneously detecting that the communication with the in-vehicle apparatus 1B is disconnected, despite the fact that there is nothing wrong with the communication with the in-vehicle apparatus 1B.

After the in-vehicle apparatus 1B has determined that a sleep condition has been satisfied, the in-vehicle apparatus 1C, the relay apparatus 2, and the in-vehicle apparatus 1A also sequentially make a determination that a sleep condition has been satisfied (S10, S11, and S12). As with the in-vehicle apparatus 1B described above, each of the in-vehicle apparatus 1A, the relay apparatus 2, and the in-vehicle apparatus 1C that have determined that a sleep condition has been satisfied generates a notification message that includes a deactivation flag for deactivating disconnection detection therefor, and transmits the generated notification message (including the deactivation flag) through, for example, broadcasting. Thereafter, each of the in-vehicle apparatus 1A, the relay apparatus 2, and the in-vehicle apparatus 1C stops the periodical transmission of notification messages, without transmitting more notification messages. The in-vehicle apparatus 1A, the relay apparatus 2, and the in-vehicle apparatus 1C make the determination that a sleep condition has been satisfied at different timings.

After it has been determined by each apparatus that a sleep condition has been satisfied, the in-vehicle apparatuses 1 and the relay apparatus 2 that belong to the same domain transition to the sleep state (sleep-ready state) at the same timing after, for example, a predetermined period of time (sleep timer period) determined by a sleep timer (S13) has elapsed. If a predetermined message is received during a period of waiting for the predetermined period of time (sleep timer period) determined by the sleep timer to elapse, one of the in-vehicle apparatuses 1 that belong to the same domain may reset the sleep timer period and another one of the in-vehicle apparatuses 1 that belong to the same domain may not reset the sleep timer period.

As a result of each of the in-vehicle apparatuses 1 and the relay apparatus 2 transitioning to the sleep state (sleep-ready state), for example, the operating frequency of the control unit 10 is reduced, power distribution to units other than the in-vehicle communication unit 12 is stopped, and power distribution to the connected actuator is stopped so as to reduce the amount of power consumption (lower dark current value).

Figure 4:
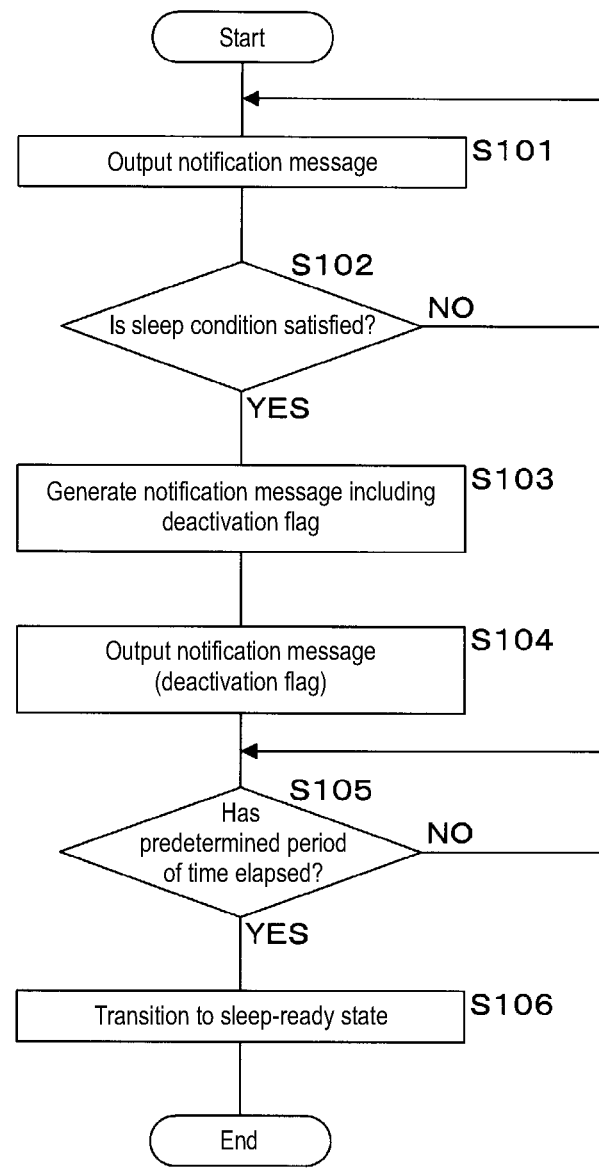
FIG. 4 is a flowchart illustrating an example of processing performed by a control unit included in an in-vehicle apparatus.

FIG. 4 is a flowchart illustrating an example of processing performed by a control unit 10 of an in-vehicle apparatus 1 according to Embodiment 1. The control unit 10 of the in-vehicle apparatus 1 constantly performs the following processing when, for example, the vehicle C is in startup state (in which the IG switch is on) or a shutdown state (in which the IG switch is off).

The control unit 10 of the in-vehicle apparatus 1 outputs a notification message (S101). The control unit 10 of the in-vehicle apparatus 1 outputs (transmits) a notification message such as, for example, an NM message to the other in-vehicle apparatuses 1 and the relay apparatus 2 that belong to the same domain through broadcasting. It goes without saying that a deactivation flag is not included in the notification message output in this processing.

The control unit 10 of the in-vehicle apparatus 1 determines whether or not a sleep condition has been satisfied (S102). The control unit 10 of the in-vehicle apparatus 1 makes the determination as to whether or not a sleep condition has been satisfied by determining whether or not a signal that triggers a transition to the sleep state, such as a sleep signal, a mode change signal for changing the mode of the vehicle C, or an IG switch off signal, has been received, or by determining whether or not an event has occurred. If it is determined that a sleep signal or the like has been received, the control unit 10 of the in-vehicle apparatus 1 determines that a sleep condition has been satisfied. If it is determined that a sleep signal or the like has not been received, the control unit 10 of the in-vehicle apparatus 1 determines that a sleep condition has not been satisfied.

If it is determined that a sleep condition has not been satisfied (NO in S102), the control unit 10 of the in-vehicle apparatus 1 performs loop processing to perform the processing in S102 again. By performing the loop processing, the control unit 10 of the in-vehicle apparatus 1 periodically, regularly, or constantly outputs a notification message, thereby notifying the other in-vehicle apparatuses 1 that the in-vehicle apparatus 1 is active. Each of the other in-vehicle apparatuses 1 detects, by acquiring (receiving) the notification message, that the communication with the in-vehicle apparatus 1 that is the transmission source of the notification message is normal, or in other words, is not disconnected.

If it is determined that a sleep condition has been satisfied (YES in S102), the control unit 10 of the in-vehicle apparatus 1 generates a notification message that includes a deactivation flag (S103). If it is determined that a sleep condition has not been satisfied in response to receiving a sleep signal or the like, the control unit 10 of the in-vehicle apparatus 1 generates a notification message that includes a deactivation flag that is defined by a predetermined bit value or the like in an area (user data area) of the payload of the NM message.

The control unit 10 of the in-vehicle apparatus 1 outputs the notification message that includes the deactivation flag (S104). The control unit 10 of the in-vehicle apparatus 1 outputs (transmits) the notification message that includes the deactivation flag (including the deactivation flag) to the other in-vehicle apparatuses 1 and the relay apparatus 2 in the same manner as the processing in S101. Each of the other in-vehicle apparatuses 1 and the relay apparatus 2 that have acquired (received) the notification message that includes the deactivation flag deactivates disconnection detection for the in-vehicle apparatus 1 that is the transmission source of the notification message. With this configuration, even if a notification message from the in-vehicle apparatus 1 that is the transmission source of the notification message is not acquired (received) thereafter, the other in-vehicle apparatuses 1 and the relay apparatus 2 do not determine that communication with the in-vehicle apparatus 1 that is the transmission source of the notification message is disconnected. Accordingly, it is possible to efficiently prevent each of the other in-vehicle apparatuses 1 and the relay apparatus 2 from erroneously detecting that the communication with the in-vehicle apparatus 1 that is the transmission source of the notification message (including the deactivation flag) is disconnected (communication error state).

The control unit 10 of the in-vehicle apparatus 1 determines whether or not a predetermined period of time has elapsed (S105). The control unit 10 of the in-vehicle apparatus 1 makes a determination as to whether or not a predetermined period of time has elapsed by, for example, determining whether or not a predetermined period of time (sleep timer period) determined by a sleep timer has elapsed. If it is determined that the predetermined period of time has not elapsed (NO in S105), the control unit 10 of the in-vehicle apparatus 1 performs loop processing to perform the processing in S105 again. If an NM message is received from another in-vehicle apparatus 1 before the predetermined period of time elapses, the control unit 10 of the in-vehicle apparatus 1 may perform initialization processing for resetting the sleep timer, or in other words, setting the elapsed time from the time when the sleep timer started counting the predetermined period of time to the current time to 0, or the like. By resetting the sleep timer when an NM message is received from another in-vehicle apparatus 1, the plurality of in-vehicle apparatuses 1 that belong to the same domain can have the same sleep timing (the timing at which the plurality of in-vehicle apparatuses 1 that belong to the same domain transition to the sleep-ready state).

If it is determined that the predetermined period of time has elapsed (YES in S105), the control unit 10 of the in-vehicle apparatus 1 is caused to transition to the sleep ready state (S106). When, for example, the predetermined period of time (sleep timer period) determined by the sleep timer has elapsed, the control unit 10 of the in-vehicle apparatus 1 is caused to transition to the sleep-ready state (sleep state) to reduce the amount of power consumed by the in-vehicle apparatus 1.

According to the present embodiment, the control unit 10 of the in-vehicle apparatus 1 that is caused to transition from the normal state to the sleep state outputs (transmits) a notification message that includes a deactivation flag for deactivating disconnection detection to the in-vehicle apparatuses 1 other than the in-vehicle apparatus 1. Accordingly, it is possible to efficiently prevent a situation in which, after the control unit 10 of the in-vehicle apparatus 1 has output a notification message that includes a deactivation flag to transition to the sleep state, even when the control unit 10 of the in-vehicle apparatus 1 does not output a notification message for a predetermined period of time set by the sleep timer or the like, the other in-vehicle apparatuses 1 erroneously detect that, for example, the communication with the in-vehicle apparatus 1 is disconnected.

Embodiment 2

Figure 5:
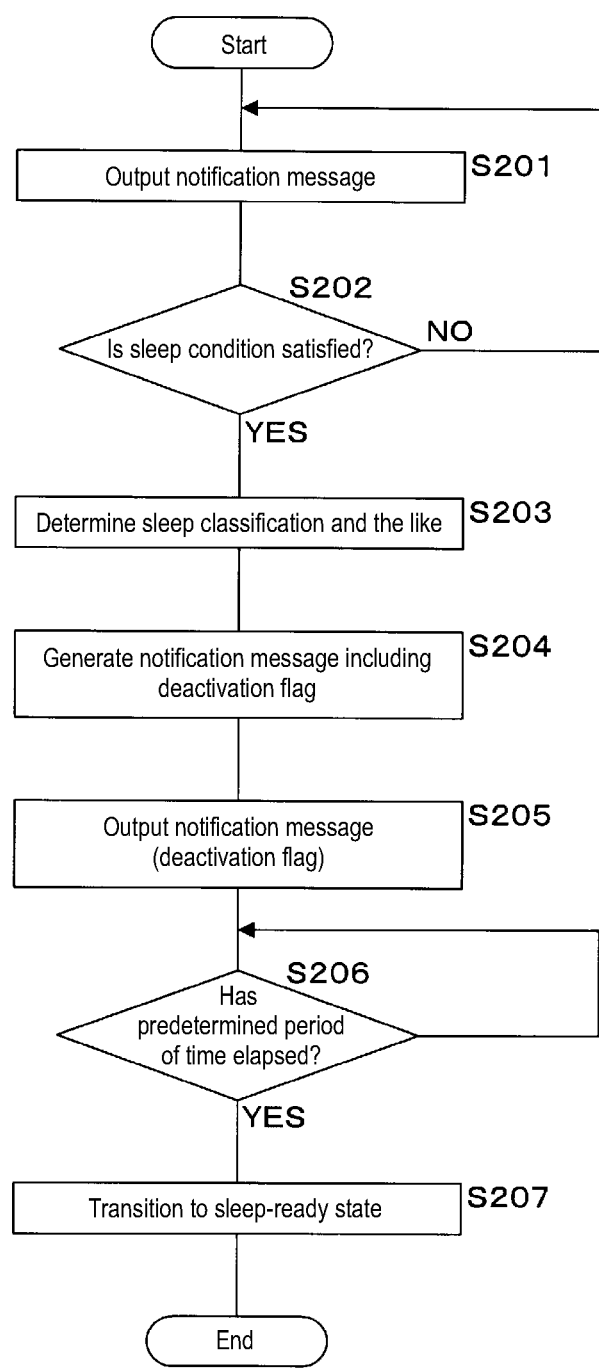
FIG. 5 is a flowchart illustrating an example of processing performed by a control unit included in an in-vehicle apparatus according to Embodiment 2 (sleep classification or the like).

FIG. 5 is a flowchart illustrating an example of processing performed by a control unit 10 included in an in-vehicle apparatus 1 according to Embodiment 2 (sleep classification or the like). The control unit 10 of the in-vehicle apparatus 1 constantly performs the following processing when, for example, the vehicle C is in startup state (in which the IG switch is on) or a shutdown state (in which the IG switch is off). The control unit 10 of the in-vehicle apparatus 1 outputs a notification message (S201). The control unit 10 of the in-vehicle apparatus 1 determines whether or not a sleep condition has been satisfied (S202). The control unit 10 of the in-vehicle apparatus 1 performs processing starting from step S201 to step S202 in the same manner as the processing starting from step S101 to step S102 of Embodiment 1. If it is determined that a sleep condition has not been satisfied (NO in S202), the control unit 10 of the in-vehicle apparatus 1 performs loop processing to perform the processing in step S201 again.

If it is determined that a sleep condition has been satisfied (YES in S202), the control unit 10 of the in-vehicle apparatus 1 determines a sleep classification that indicates a classification of the sleep state or the like according to the determined sleep condition (S203). The sleep state to which the in-vehicle apparatus 1 is caused to transition is classified into a plurality of states (sleep classifications) based on, for example, the length of the sleep timer period, the type of domain of which apparatuses are subjected to simultaneous sleep, a power saving mode during the sleep state, or the like. Also, the sleep conditions that need to be satisfied when the in-vehicle apparatus 1 is caused to transition to the sleep state include a plurality of conditions according to, for example, the type of trigger signal acquired (received) by the in vehicle apparatus 1, the state or the operating mode of the vehicle C when the sleep condition is satisfied, or the like.

FIG. 6 is an illustrative diagram showing an example of activation flags according to the sleep classifications or the like. The storage unit 11 of the in-vehicle apparatus 1 stores (records), for example, a matrix table of sleep classifications and sleep conditions that were described above, and thereby deactivation flags, each corresponding to a combination of sleep classification and sleep condition, are defined. In the present embodiment, the deactivation flags are each defined according to a combination of sleep classification and sleep condition, but the deactivation flags are not limited thereto, and may each be defined according to either one of sleep classification or sleep condition. That is, the values of the deactivation flags (flag values) vary depending on sleep classification, sleep condition, or a combination of sleep classification and sleep condition. The control unit 10 of the in-vehicle apparatus 1 determines a sleep classification, a sleep condition, and a combination of the sleep classification and the sleep condition based on the sleep condition determined as being satisfied in the processing in step S202, the state of the vehicle C, and the like, and then determines (selects) a deactivation flag that corresponds to the combination of the sleep classification and the sleep condition with reference to the table stored in the storage unit 11 of the in-vehicle apparatus 1.

The control unit 10 of the in-vehicle apparatus 1 generates a notification message that includes the deactivation flag (S204). The control unit 10 of the in-vehicle apparatus 1 generates a notification message that includes the deactivation flag that corresponds to the combination of the sleep classification and the sleep condition.

The control unit 10 of the in-vehicle apparatus 1 outputs the generated notification message that includes the deactivation flag (S205). The control unit 10 of the in-vehicle apparatus 1 performs processing in step S205 in the same manner as the processing in step S104 of Embodiment 1. In the same manner as in Embodiment 1, each of the other in-vehicle apparatuses 1 and the relay apparatus 2 that have acquired (received) the notification message that includes the deactivation flag deactivates disconnection detection for the in-vehicle apparatus 1 that is the transmission source of the notification message. Accordingly, it is possible to prevent erroneous detection by the other in-vehicle apparatuses 1 and the like.

The deactivation flag included in the notification message transmitted from the in-vehicle apparatus 1 is a deactivation flag selected according to the combination of the sleep classification and the sleep condition. Accordingly, the other in-vehicle apparatuses 1 and the relay apparatus 2 that have received the notification message can recognize the sleep classification and the sleep condition of the in-vehicle apparatus 1 that transmitted the notification message, based on the deactivation flag. With this configuration, the other in-vehicle apparatuses 1 that have acquired (received) the notification message can appropriately perform processing according to the sleep classification or the sleep condition of the in-vehicle apparatus 1 that is the target of the deactivated disconnection detection.

The control unit 10 of the in-vehicle apparatus 1 determines whether a predetermined period of time has elapsed (S206). If it is determined that the predetermined period of time has not elapsed (NO in S206), the control unit 10 of the in-vehicle apparatus 1 performs loop processing to perform the processing in step S206 again. If it is determined that the predetermined period of time has elapsed (YES in S206), the control unit 10 of the in-vehicle apparatus 1 is caused to transition to the sleep-ready state (S207). The control unit 10 of the in-vehicle apparatus 1 performs processing in step S206 to step S207 in the same manner as the processing in S105 to S106 of Embodiment 1.

Embodiment 3

Figure 7:
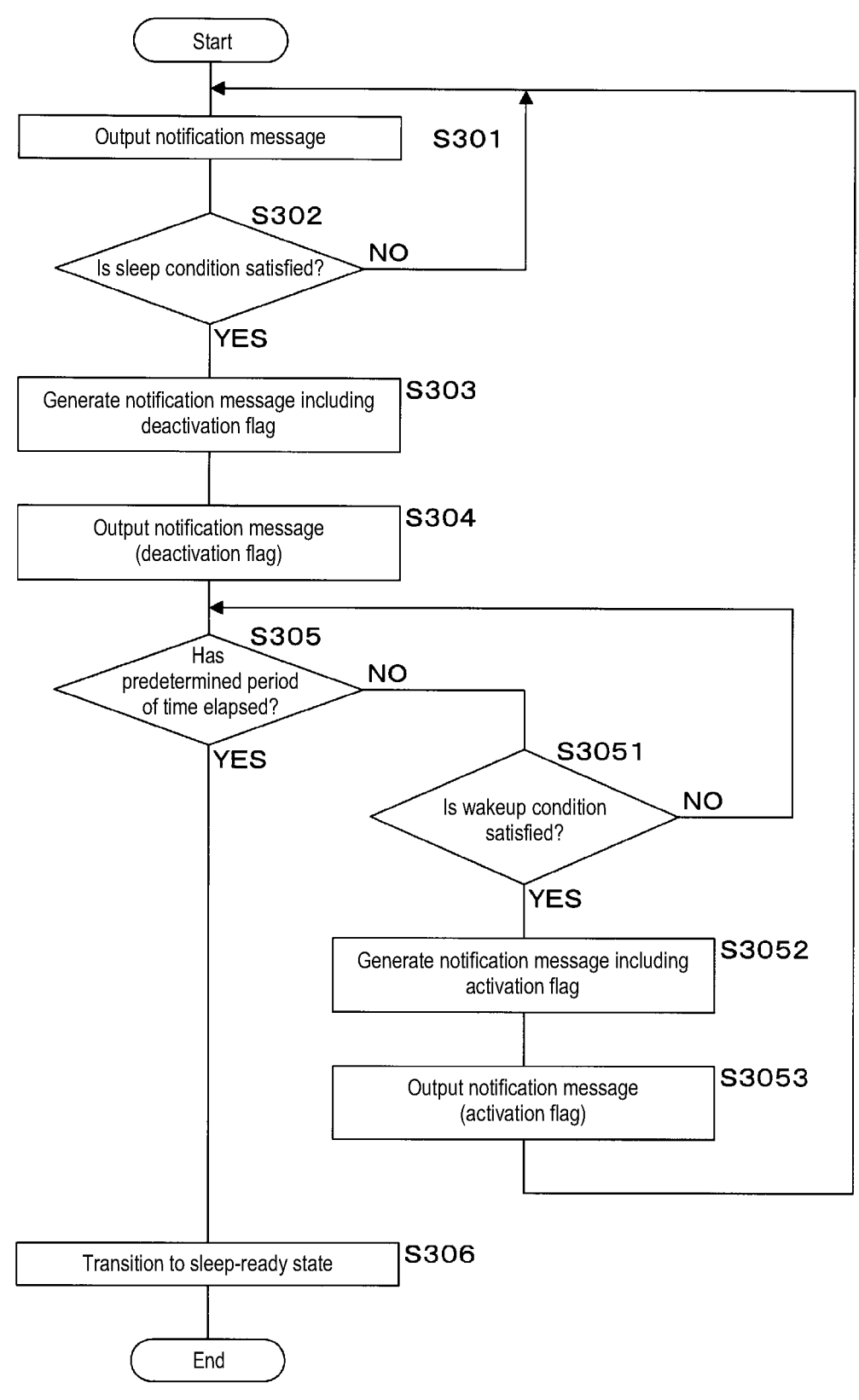
FIG. 7 is a flowchart illustrating an example of processing performed by a control unit included in an in-vehicle apparatus according to Embodiment 3 (activation flag).

FIG. 7 is a flowchart illustrating an example of processing performed by a control unit 10 included in an in-vehicle apparatus 1 according to Embodiment 3 (activation flag). The control unit 10 of the in-vehicle apparatus 1 constantly performs the following processing when, for example, the vehicle C is in a startup state (in which the IG switch is on) or a shutdown state (in which the IG switch is off). The control unit 10 of the in-vehicle apparatus 1 performs processing starting from step S301 to step S305 in the same manner as the processing starting from step S101 to step S105 of Embodiment 1. If it is determined that a predetermined period of time has elapsed (YES in S305), the control unit 10 of the in-vehicle apparatus 1 is caused to transition to the sleep-ready state (S306). The control unit 10 of the in-vehicle apparatus 1 performs processing in step S306 in the same manner as the processing in step S106 of Embodiment 1.

If it is determined that the predetermined period of time has not elapsed (NO in S305), the control unit 10 of the in-vehicle apparatus 1 determines whether or not a wakeup condition has been satisfied (S3051). The control unit 10 of the in-vehicle apparatus 1 makes the determination as to whether or not a wakeup condition is satisfied by determining whether or not a signal that triggers a transition from the sleep state to the normal state, such as, for example, a wakeup signal, a mode change signal for changing the mode of the vehicle C, or an IG switch on signal, has been received, or by determining whether or not an event has occurred. If it is determined that the wakeup signal or the like has been received, the control unit 10 of the in-vehicle apparatus 1 determines that a wakeup condition has been satisfied. If it is determined that the wakeup signal or the like has not been received, the control unit 10 of the in-vehicle apparatus 1 determines that a wakeup condition has not been satisfied. If it is determined that a wakeup condition has not been satisfied (NO in S3051), the control unit 10 of the in-vehicle apparatus 1 performs loop processing to perform the processing in S305 again.

If it is determined that a wakeup condition has been satisfied (YES in S3051), the control unit 10 of the in-vehicle apparatus 1 generates a notification message that includes an activation flag (S3052). If it is determined that a wakeup condition has been satisfied by receiving the wakeup signal or the like, the control unit 10 of the in-vehicle apparatus 1 generates a notification message that includes an activation flag that is defined by a predetermined bit value or the like in an area (user data area) of the payload of the NM message. It is needless to say that the bit value of the activation flag is a value different from the bit value of the deactivation flag.

The control unit 10 of the in-vehicle apparatus 1 outputs the notification message that includes the activation flag (including the activation flag) (S3053). The control unit 10 of the in-vehicle apparatus 1 outputs (transmits) the notification message that includes the activation flag (including the activation flag) to the other in vehicle apparatuses 1 and the relay apparatus 2. The control unit 10 of the in-vehicle apparatus 1 performs loop processing to again perform the processing starting from step S301 after step S3053 has been performed.

After the processing in step S306 has been performed, the control unit 10 of the in-vehicle apparatus 1 ends the series of processing operations of the flowchart. Alternatively, after the processing in step S306 has been performed, the control unit 10 of the in-vehicle apparatus 1 may perform the same processing as the processing starting from step S3051 to step S3053 (the processing for determining whether or not a wakeup condition has been satisfied).

The control unit 10 of the in-vehicle apparatus 1 periodically, regularly or constantly outputs a notification message to the other in-vehicle apparatuses 1 to notify the other in-vehicle apparatus 1 that the in-vehicle apparatus 1 is active. That is, the in-vehicle apparatus 1 is in the normal state. Each of the other in-vehicle apparatuses 1 and the relay apparatus 2 that have acquired (received) the notification message that includes the activation flag activates disconnection detection for the in-vehicle apparatus 1 that is the transmission source of the notification message. With this configuration, thereafter, by acquiring (receiving) the notification message, the other in-vehicle apparatuses 1 can detect that communication with the in-vehicle apparatus 1 that is the transmission source of the notification message is normal, or in other words, is not disconnected.

According to the present embodiment, even if the disconnection detection of another in-vehicle apparatus 1 is deactivated, the disconnection detection of the other in-vehicle apparatus 1 can be activated because a notification message that includes an activation flag is output when the in-vehicle apparatus 1 that is the target of the disconnection detection is caused to transition from the sleep state to the normal state.

The embodiments disclosed herein are exemplary in all aspects, and thus should not be construed as limiting. The scope of the disclosure of the present application is indicated by the appended claims rather than the foregoing description, and all changes that come within the scope of the claims and the meaning of equivalency of the claims are intended to be embraced within the scope of the disclosure of the present application.

The invention claimed is:

1. An in-vehicle apparatus that is mounted in a vehicle and connected to another in-vehicle apparatus so as to be capable of communicating with the other in-vehicle apparatus via an in-vehicle network, the in-vehicle apparatus comprising:

a control unit that controls communication with the other in-vehicle apparatus, wherein, when the control unit causes the in-vehicle apparatus to transition from a normal state to a sleep state, the control unit generates a notification message that is defined by AUTOSAR by including, in the notification message, a deactivation flag for causing the other in-vehicle apparatus to deactivate disconnection detection, and outputs the generated notification message, wherein, when the control unit causes the in-vehicle apparatus to transition from the normal state to the sleep state, the control unit determines a sleep classification that indicates a classification of the sleep state, generates the notification message that includes the deactivation flag corresponding to the determined sleep classification, and outputs the notification message to cause the other in-vehicle apparatus to deactivate disconnection detection, the sleep classification being based on at least one of the following: a length of a sleep timer period, a type of domain of the in-vehicle apparatuses are subjected to simultaneous sleep, and a power saving mode during the sleep state.

2. The in-vehicle apparatus according to claim 1, wherein the notification message is regularly transmitted and received between the in-vehicle apparatus and the other in-vehicle apparatus, and when the in-vehicle apparatus stays in the normal state, the control unit generates the notification message without including the deactivation flag in the notification message, and outputs the generated notification message.

3. The in-vehicle apparatus according to claim 1, wherein, when the control unit causes the in-vehicle apparatus to transition from the normal state to the sleep state, the control unit generates the notification message by including, in the notification message, an activation flag for causing the other in-vehicle apparatus to activate disconnection detection, and outputs the generated notification message.

4. The in-vehicle apparatus according to claim 1, wherein the in-vehicle network uses CAN, LIN, FlexRay, or TCP/IP as a communication protocol, and the control unit outputs the notification message through broadcasting.

5. The in-vehicle apparatus according to claim 1, wherein, when the control unit causes the in-vehicle apparatus to transition from the normal state to the sleep state, the control unit determines a sleep condition for causing the in-vehicle apparatus to transition to the sleep state, generates the notification message that includes the deactivation flag corresponding to the determined sleep condition and the sleep classification, and outputs the notification message to cause the other in-vehicle apparatus to deactivate disconnection detection.

6. An information processing method for causing a computer that is mounted in a vehicle and connected to another computer so as to be capable of communicating with the other computer via an in-vehicle network to execute processing operations of:

when the computer is caused to transition from a normal state to a sleep state, generating a notification message that is defined by AUTOSAR by including, in the notification message, a deactivation flag for causing the other computer to deactivate disconnection detection; and outputting the generated notification message, wherein the notification message includes a deactivation flag for causing the other in-vehicle apparatus to deactivate disconnection detection, the deactivation flag based on a sleep classification that indicates a classification of the sleep state, the sleep classification being based on at least one of the following: a length of a sleep timer period, a type of domain of the in-vehicle apparatuses are subjected to simultaneous sleep, and a power saving mode during the sleep state.

7. A computer program product for causing a computer that is mounted in a vehicle and connected to another computer so as to be capable of communicating with the other computer via an in-vehicle network, the computer program product comprising a non-transitory, machine-readable medium storing instructions which, when executed by at least one programmable processor, causes at least one programmable processor to perform operations comprising:

when the computer is caused to transition from a normal state to a sleep state, generating a notification message that is defined by AUTOSAR by including, in the notification message, a deactivation flag for causing the other computer to deactivate disconnection detection; and outputting the generated notification message, wherein the notification message includes a deactivation flag for causing the other in-vehicle apparatus to deactivate disconnection detection, the deactivation flag based on a sleep classification that indicates a classification of the sleep state, the sleep classification being based on at least one of the following: a length of a sleep timer period, a type of domain of the in-vehicle apparatuses are subjected to simultaneous sleep, and a power saving mode during the sleep state.

* * * * *